(12) United States Patent
Mather

(10) Patent No.: US 7,325,107 B2
(45) Date of Patent: Jan. 29, 2008

(54) IMPLEMENTING MEMORY EVACUATION USING COPY-ON-WRITE

(75) Inventor: Clifford J. Mather, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 11/061,391

(22) Filed: Feb. 18, 2005

(65) Prior Publication Data

US 2006/0190687 A1    Aug. 24, 2006

(51) Int. Cl.
*G06F 12/00* (2006.01)
(52) U.S. Cl. ...................... 711/159; 711/133
(58) Field of Classification Search ............ 711/133, 711/159
See application file for complete search history.

(56) References Cited

U.S. PATENT DOCUMENTS

| 5,764,944 | A * | 6/1998 | Hwang et al. ............... 711/207 |
| 6,453,408 | B1 * | 9/2002 | Stuart Fiske et al. ......... 712/29 |
| 6,859,812 | B1 * | 2/2005 | Poynor ....................... 707/203 |
| 2005/0066095 | A1 * | 3/2005 | Mullick et al. ............. 710/200 |
| 2005/0210461 | A1 * | 9/2005 | Srivastava et al. .......... 717/170 |

* cited by examiner

*Primary Examiner*—Reginald Bragdon
*Assistant Examiner*—Aracelis Ruiz

(57) ABSTRACT

A method for evacuating a source memory page. The method includes ascertaining a first set of processes, the first set of processes representing processes currently accessing the source memory page. The method also includes manipulating parameters associated with the source memory page to enable at least one copy-on-write procedure to be performed on the source memory page irrespective whether the first set of processes has only one process or the first set of processes has multiple processes.

31 Claims, 4 Drawing Sheets

IMPLEMENTING MEMORY EVACUATION USING COPY-ON-WRITE

BACKGROUND OF THE INVENTION

A computer system may sometimes have a need to evacuate the content of one or more pages of memory. For example, when it is suspected that a page of memory may be defective, it is desirable to remove that page of memory from use. As another example, in a computer with multiple partitions, it may be useful to assign a page of memory from one partition to another partition (for load balancing, for example). Since the page of memory to be removed or reassigned may be accessed by executing processes and/or devices, it is necessary to properly evacuate the content of the memory page so that such executing processes and/or devices can continue with minimal disruption vis-a-vis a new memory page.

To facilitate discussion, FIG. 1 shows an example computer system 102, including a CPU 104, an I/O module 106, and a memory module 108, all connected via a bus 110. Computer 102 is intended to be illustrative and is thus vastly simplified. In reality, computer 102 may represent a computer system with multiple CPUs, multiple I/O modules, multiple memory modules, and may have its components dispersed geographically among different enclosures. A bus-based architecture is also not a requisite feature of computer system 102.

Memory module 108 is typically implemented using some type of semiconductor memory for fast access. Within memory module 108, there are shown a plurality of pages A-L. In the example of FIG. 1, memory pages A, E, F, H, and K have contents stored in them. The contents in these memory pages A, E, F, H, and K may be utilized by processes executing using CPU 104, for example. Memory pages B, C, G, I, J, and L are shown to be free memory pages. Memory evacuation refers to the process of transferring or copying the content from a source memory page (e.g., the content from memory page A) to a destination memory page (e.g., memory page C) so that the source memory page can be freed up after the evacuation process is complete. For simplicity, the source memory page and the destination memory page belong to the same memory module in the example of FIG. 1. In fact, memory evacuation works even if memory pages are dispersed among different memory modules.

At a high level, memory evacuation appears to be a fairly straight forward procedure. However, reliable and robust memory evacuation involve handling the myriads of operating system-specific situations, the details of which vary from operating system to operating system, and all of which need to be properly handled. For example, memory evacuation involves algorithms for properly selecting the target free memory page (e.g., memory page C) for optimum performance, properly locking and unlocking memory pages during the evacuation operation (e.g., to prevent other processes from accessing the target memory page and/or the source memory page during the evacuation operation), handling edge conditions such as pending memory I/O accesses by the source memory page or concurrent sharing of the source memory page, etc.

A brute force approach to implementing memory evacuation may involve creating code that would properly handle all of the aforementioned situations, as well as other situations that may impact the memory evacuation procedure. However, such a brute force approach necessarily involves extensive coding and testing to ensure that all situations are properly handled. The time-consuming processes of coding and testing need to be repeated for different operating systems since, as mentioned earlier, the details pertaining to memory allocation and/or memory content transfer may vary from operating system to operating system.

SUMMARY OF INVENTION

The invention relates, in an embodiment, to a method for evacuating a source memory page. The method includes ascertaining a first set of processes, the first set of processes representing processes currently accessing the source memory page. The method also includes manipulating parameters associated with the source memory page to enable at least one copy-on-write procedure to be performed on the source memory page irrespective whether the first set of processes has only one process or the first set of processes has multiple processes.

In another embodiment, the invention relates to a method for evacuating a source memory page. The method includes ascertaining a first set of processes, the first set of processes representing processes currently accessing the source memory page. The method further includes performing the following steps a) through c) for each process in the first set of processes. Step a) involves incrementing a first value of a sharer attribute associated with the source memory page by 1, the first value indicating the number of processes that accesses the source memory page. Step b) involves invoking, after the increasing, copy-on-write procedure for the source memory page, thereby allowing the each process to be redirected to a respective target memory page whose content is copied from the source memory page by the copy-on-write procedure. Step c) involves decrementing, after the invoking, decrementing a second value of the sharer attribute associated with the source memory page by 1, the second value indicating the number of processes that accesses the source memory page after the invoking.

In yet another embodiment, the invention relates to an article of manufacture comprising a program storage medium having computer readable code embodied therein. The computer readable code is configured to evacuate a source memory page. There is included computer readable code ascertaining a first set of processes, the first set of processes representing processes currently accessing the source memory page. There is also included computer readable code for manipulating parameters associated with the source memory page to enable at least one copy-on-write procedure to be performed on the source memory page irrespective whether the first set of processes has only one process or the first set of processes has multiple processes.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The inventor herein has noted that most modern operating systems provide a copy-on-write facility to allow a process to obtain a private copy of a memory page if that process wishes to modify the memory page. To elaborate, multiple processes may share a memory page for read-only purposes. Since no modification is made to the memory page, the sharing of a memory page by multiple processes for read-only purpose is implemented by most modern operating systems to encourage efficient memory utilization. When a process indicates that it wishes to modify or write to that memory page, it becomes necessary to furnish a private copy of that memory page to the modifying process. The copy-on-write procedure is therefore furnished by most operating systems to allow the modifying process to obtain a private copy of a memory page.

However, the copy-on-write procedure assumes that the memory page is shared by a plurality of sharing processes. This is because it would have been pointless to create a private copy of a memory page for a process if that process is already the only process accessing that memory page. Accordingly, the copy-on-write procedure, without more, is not suitable for implementing memory evacuation since some memory evacuations may involve moving the content of a memory page that is accessed by a single process to another memory page.

Figure 1:
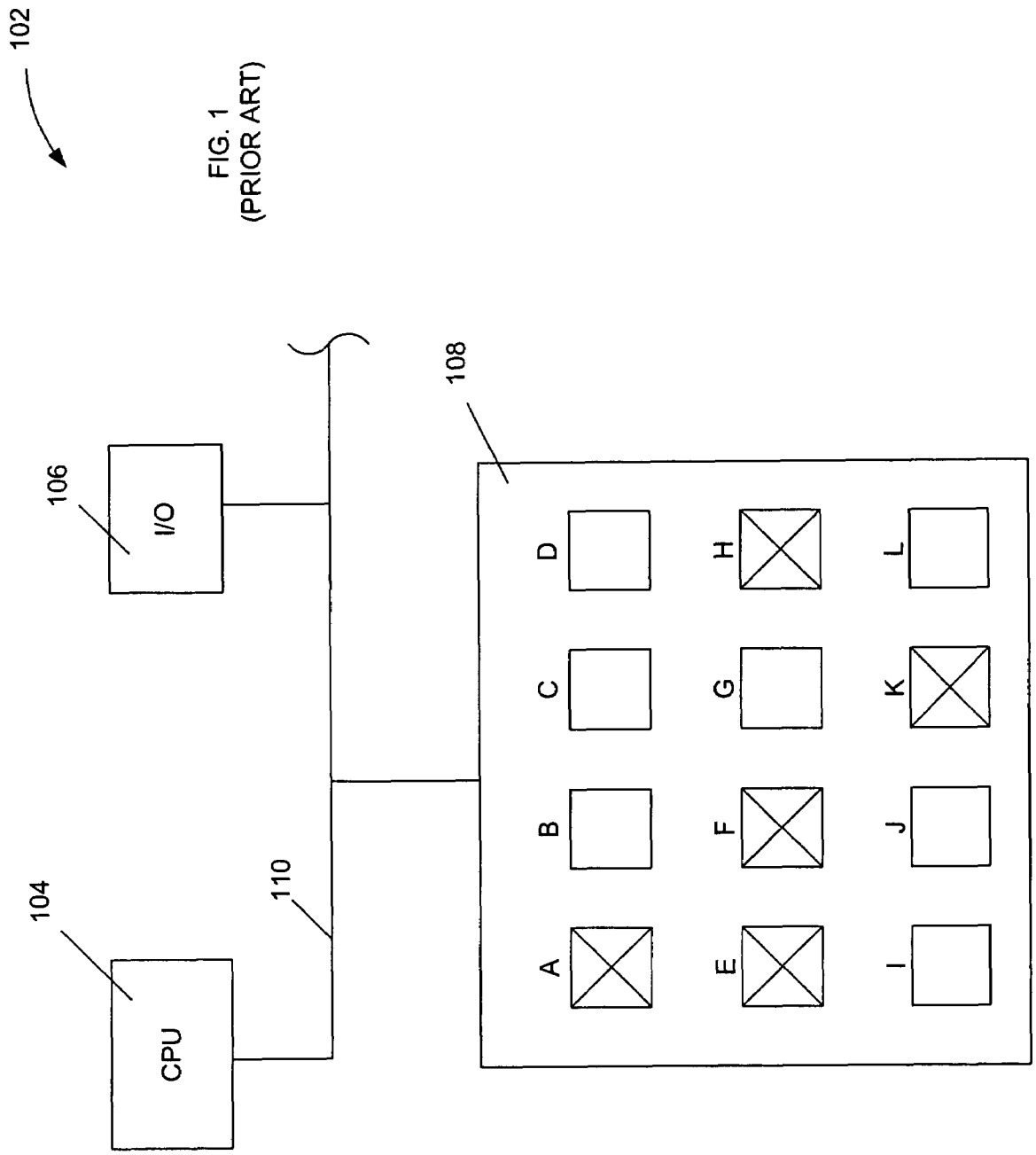
FIG. 1 shows an example computer system, including a CPU, an I/O module, and a memory module, all connected via a bus to facilitate discussion of the memory evacuation problem.
Figure 2:
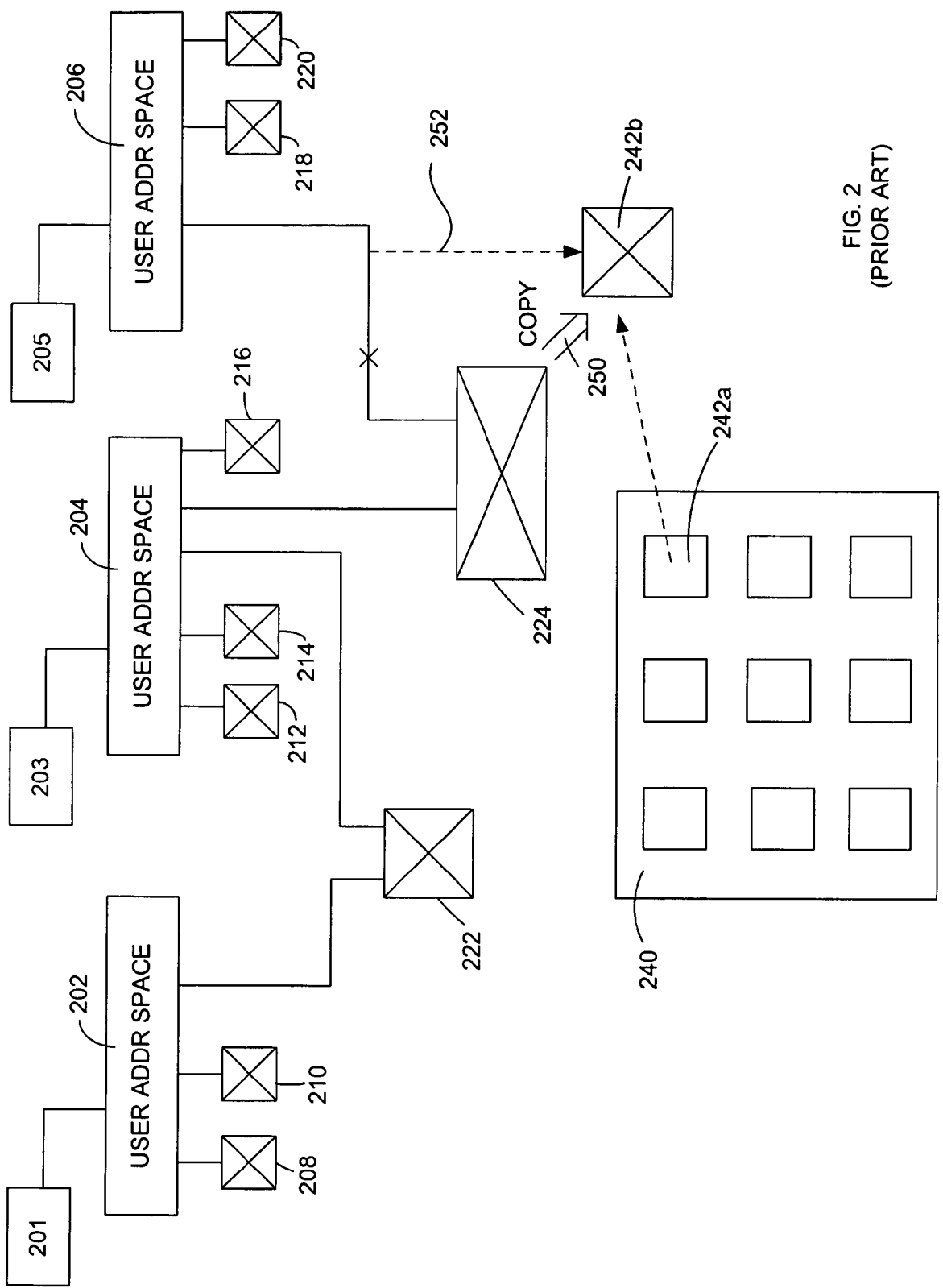
FIG. 2 is a prior art illustration showing how the copy-on-write procedure may be employed to create a private copy of a memory page for a modifying process.

To facilitate discussion of the copy-on-write operation, FIG. 2 is a prior art illustration showing how the copy-on-write procedure may be employed to create a private copy of a memory page for a modifying process. Referring to FIG. 2, there are shown a plurality of processes 201, 203, and 205, representing processes concurrently executing in a computer system. These processes are associated with respective user address spaces 202, 204, and 206 as shown.

During execution, these processes, via their respective address spaces, access a plurality of memory pages 208, 210, 212, 214, 216, 218, 220, 222, and 224. Process 201 has a private copy of memory page 208 and a private copy of memory page 210. Process 203 has a private copy of memory page 212, a private copy of memory page 214, and a private copy of memory page 216. Process 205 has a private copy of memory page 218 and a private copy of memory page 220.

Memory page 222 is shared by processes 201 and 203, while memory page 224 is shared by processes 203 and 205. Both memory pages 222 and 224 are read-only memory pages. Suppose that process 205 now wishes to modify the content of memory page 224. In order to allow process 205 to modify the content of memory page 224, process 205 needs to be furnished with its own private copy of memory page 224. Accordingly, a copy-on-write procedure is performed on memory page 224 with respect to process 205 to allow process 205 to obtain a private copy of memory page 224.

The copy-on-write procedure starts by ascertaining a suitable free memory page among a free memory pool 240. There are various considerations involved in picking the free memory page, e.g., in order to optimize write performance by process 205 and to minimize performance impact on the system. Techniques for picking the appropriate free memory page from a pool are known.

Suppose that a free memory page 242(a) is selected from free memory pool 240. The copy-on-write procedure then copies (via arrow 250) the content of memory page 224 into this selected free memory page 242(a), resulting in a memory page 242 (b). The copy-on-write procedure then redirects (as shown by arrow 252) the pointer from process 205 to point to memory page 242(b), thereby causing process 205 to access memory page 242(b) for writing purposes.

In the example of FIG. 2, since process 203 is the sole process that accesses memory page 224 after the copy-on-write procedure is performed on memory page 224, process 203 is said have a private copy in memory page 224 and may subsequently modify (or write to) memory page 224 if desired. Note that it is not necessary to perform a copy-on-write on memory page 224 to allow process 203 to modify memory page 224 at this point. Generally speaking, the copy-on-write procedure cannot be properly invoked if the memory page is not accessed by more than one process.

It is realized by the inventor herein that if the copy-on-write procedure can be "tricked" into performing its copy-on-write function on command, even on a memory page that is not shared, it is possible to reuse the copy-on-write procedure of the operating system to handle memory evacuation. Since the copy-on-write procedure already includes algorithms that handle difficult memory allocation and content transfer situations, the reuse of the copy-on-write procedure vastly simplifies the implementation of the memory evacuation function. Since the copy-on-write procedure is provided by the operating system, it is already optimized and/or adapted for that operating system. Reusing the copy-on-write procedure thus eliminates the need to modify or adapt the memory evacuation code to different operating systems.

In an embodiment, steps are taken to modify attributes associated with the source memory page (i.e., the memory page to be evacuated) so that the copy-on-write procedure can be reliably performed on that memory page. Further, after the copy-on-write procedure is performed, the attributes are restored so that the earlier manipulation to "trick" the copy-on-write procedure would be undone. The copy-on-write procedure is performed for each process that shares the source memory page. When all sharing processes are furnished with their own private copies, the evacuation is considered complete, and the source memory page can be freed up.

In an embodiment, each previously sharing process is furnished with its own private copy. In another embodiment, processes that continue to share after the memory evacuation procedure are permitted to share a copy after the memory evacuation procedure is completed in order to more efficiently utilize the memory. For example, these sharing procedures may, after being given their own copies due to the operation of the copy-on-write procedure, be redirected to share a single destination copy.

Figure 3:
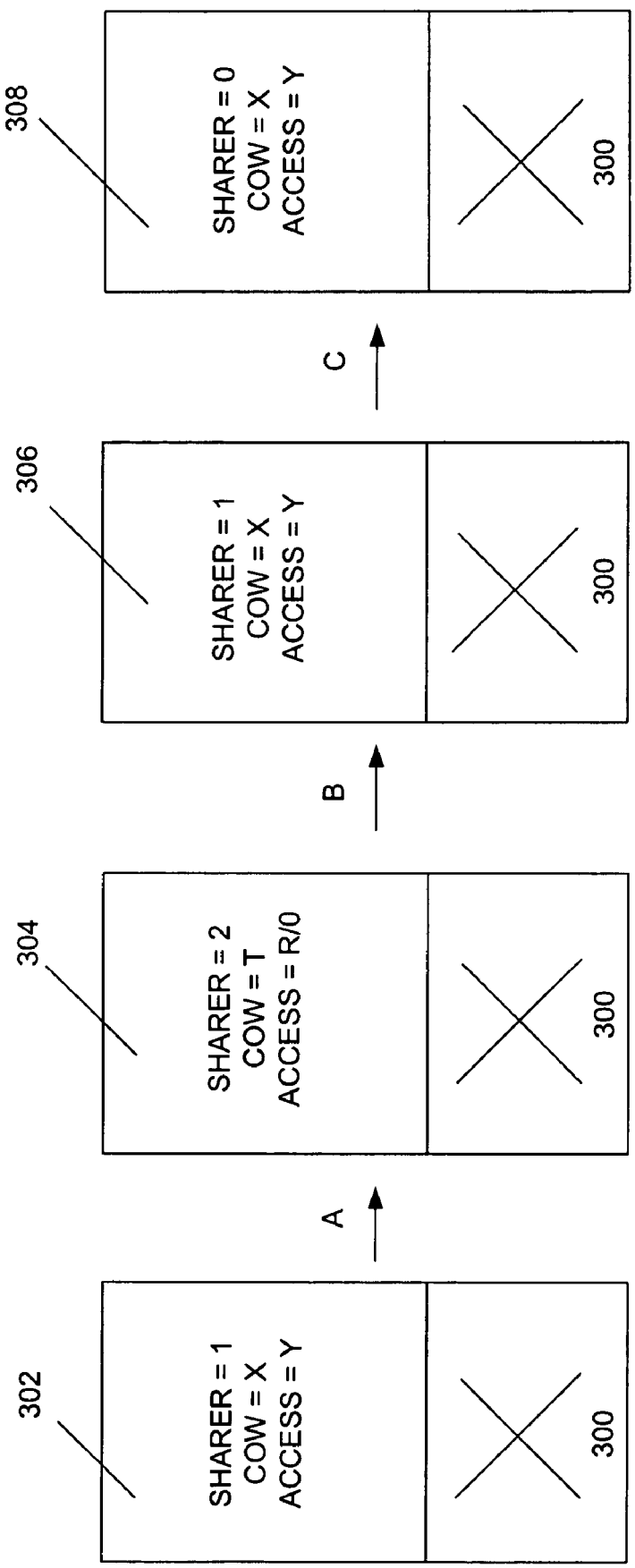
FIG. 3 illustrates, in accordance with an embodiment of the present invention, how the copy-on-write procedure can be employed to implement memory evacuation for an example memory page.

The features and advantages of the invention may be better understood with reference to the figures and discussions that follow. FIG. 3 illustrates, in accordance with an embodiment of the present invention, how the copy-on-write procedure can be employed to implement memory evacuation for an example memory page. In FIG. 3, suppose memory page 300 is the source memory page to be evacuated. Prior to evacuation, the state of memory page 300 is designated by reference number 302. Further, suppose that memory page 300 is shared by 1, i.e., only a single process currently accesses memory page 300. The current copy-on-write attribute of memory page 300 is X, whereby X can be any existing copy-on-write attribute value that memory page 300 may have. The current access attribute of memory page 300 is Y, whereby Y can be any existing access attribute value that memory page 300 may have.

In step A, the attributes of memory page 300 is manipulated to ensure that the copy-on-write procedure can be invoked and can be executed on memory page 300. First, the value of the sharer attribute is artificially and temporarily incremented by 1, thereby resulting in a value of 2 for the sharer attribute. The copy-on-write procedure is modified from its existing value (X) to "true" to indicate to the operating system that memory page 300 is a memory page that is subject to the copy-on-write operation. The access attribute is changed from its existing value (Y) to "read-only." This manipulation in effect allows the copy-on-write procedure to execute properly even if the source memory page was previously a private copy furnished to a single process (a situation for which copy-on-write is inapplicable without the aforementioned manipulation). The resultant memory page is shown by reference number 304.

In step B, the copy-on-write procedure is invoked and executed on the version of memory page 300 that is referenced by reference number 304, i.e., the version of memory page 300 after attributes have been artificially changed to facilitate the use of the copy-on-write procedure. The execution of the copy-on-write procedure results in the creation of a private copy of memory page 300 (not shown), which copy is now accessed by the process that previously accessed memory page 300 that is referenced by state 302. The state of memory page 300 after the execution of the copy-on-write procedure is referenced by reference number 306.

The copy-on-write procedure also decrements the sharer attribute value by 1, resulting in a sharer value of 1 for the sharer attribute. Further, the copy-on-write procedure restores the access attribute and the copy-on-write attribute back to the values that existed at the state referenced by reference number 302. This restoration is performed using stored parameters reflecting the values that existed for page 300 prior to the manipulation of step A.

In step C, the value of the sharer attribute is decremented by 1 to undo the artificial incrementing taken place earlier in step A. Since the copy-on-write procedure already decremented the value of the sharer attribute from 2 to 1, the decrementing in step C results in a sharer value of zero. In other words, the memory page 300 at state 308 is not accessed by any process. Accordingly, memory page 300 may now be freed up.

Figure 4:
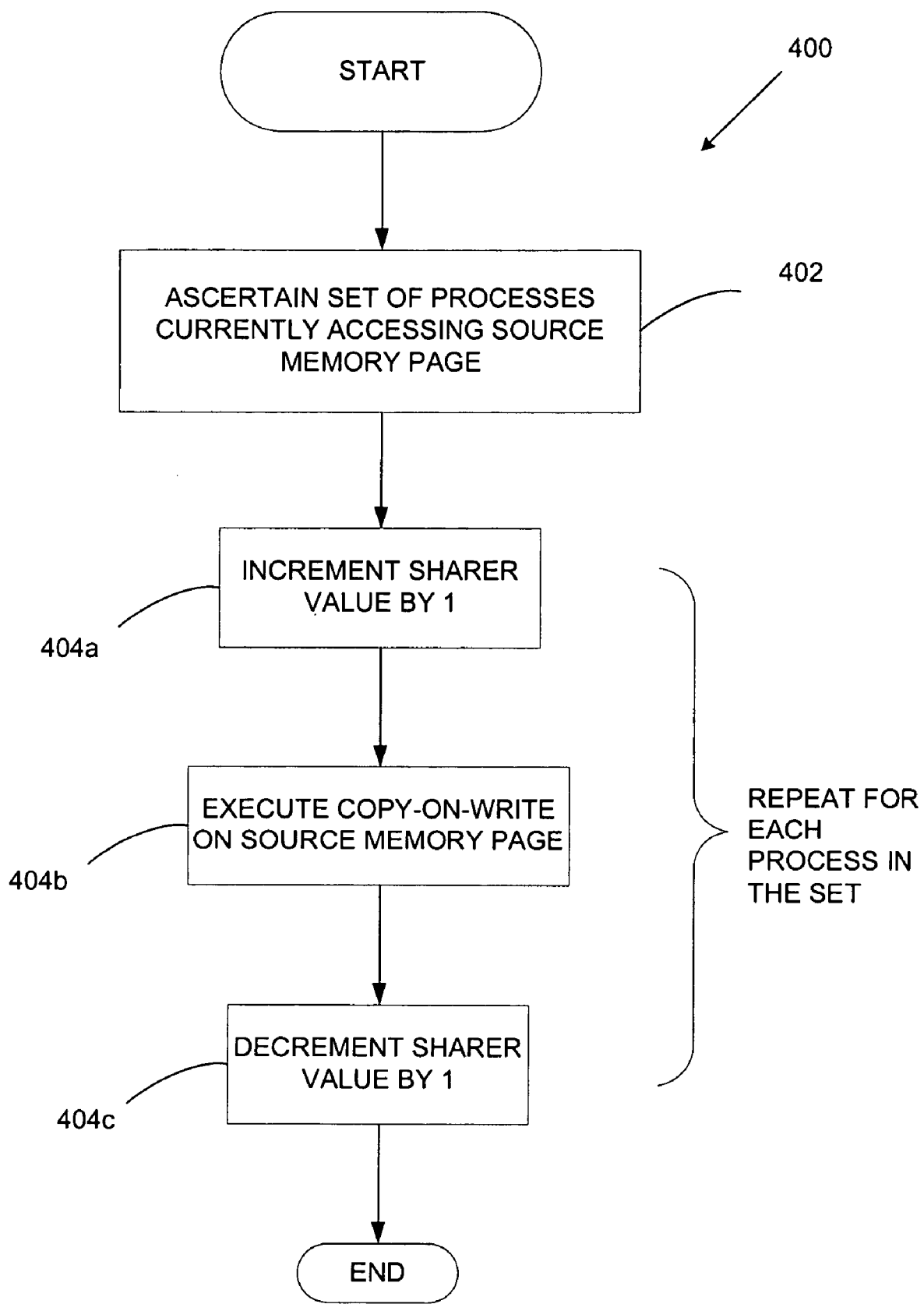
FIG. 4 shows, in accordance with an embodiment of the present invention, a flowchart illustrating the steps for implementing memory evacuation of a source memory page using the copy-on-write procedure.

FIG. 4 shows, in accordance with an embodiment of the present invention, a flowchart illustrating the steps for implementing memory evacuation of a source memory page using the copy-on-write procedure. In step 402, the set of processes currently accessing the source memory page is ascertained. For each process in the set of processes accessing the source memory page prior to memory evacuation, steps 404a, 404b, and 404c are performed. In step 404a, the value of the sharer attribute associated with the source memory page is incremented by 1. As shown in FIG. 3, this step has the effect of allowing the copy-on-write procedure to execute properly even if the source memory page is a memory page accessed by a single process. If there are multiple processes sharing the memory page, the incrementing will not create an error since this artificial incrementing in the sharer value will be accounted for after invoking the copy-on-write procedure. In an embodiment, the access attribute of the source memory page is set to "read only," and the copy-on-write attribute of the source memory page is set to "true" to facilitate the execution of the copy-on-write procedure.

In step 404b, the copy-on-write procedure is executed on the source memory page. The execution of the copy-on-write procedure will automatically decrement the sharer value by 1 and also restores the access attribute and the copy-on-write attribute back to the attribute values that existed.

In step 404c, the value of the sharer attribute is decremented by 1 in order to account for the artificial increase in the sharer value prior to executing the copy-on-write procedure. The steps 404a, 404b, and 404c continue for each process that shares in the access of the source memory page until all processes are redirected to their own target memory pages.

As can be appreciated from the foregoing, embodiments of the invention enable the copy-on-write procedure to be reused for implementing the memory evacuation function. This is made possible by manipulating attributes of the source memory page to enable to copy-on-write procedure to be executed even in situations where copy-on-write would have been inappropriate otherwise (e.g., when the source memory page is a private memory page accessed by a single process). Embodiments of the invention manipulate the attributes of the source memory page in such a way that copy-on-write can be reliably executed irrespective of how many processes access the memory page prior to memory evacuation, irrespective of the access status of the source memory page, and/or irrespective whether the source memory page was designated for a copy-on-write operation.

Since the operating system's own copy-on-write procedure is employed to implement memory evacuation, peculiarities of the operating system have already been handled by the built-in copy-on-write procedure, thereby eliminating the need for the implementer of the memory evacuation function to handle those peculiarities. Accordingly, embodiments of the invention enable the memory evacuation function to be efficiently implemented with minimal effort, representing a vast improvement over the brute force approach to memory evacuation.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for evacuating a source memory page, comprising:
    ascertaining a first set of processes, said first set of processes representing processes currently accessing said source memory page; and
    manipulating parameters associated with said source memory page to enable at least one copy-on-write procedure to be performed on said source memory page irrespective whether said first set of processes has only one process or said first set of processes has multiple processes;
    wherein said manipulating comprises setting a sharer attribute in the parameters to a value that is greater than a number of processes in said first set, prior to performing said at least one copy-on-write procedure on said source memory page.

2. The method of claim 1 further comprising performing said copy-on-write procedure for a sufficient number of times such that each process in said set of processes is redirected to a respective target memory page whose content is copied from said source memory page and such that said source memory page is free from access by any process of said set of processes after said performing.

3. The method of claim 2 further comprising decrementing, after said performing, the value of said sharer attribute associated with said source memory page by 1 so that said sharer attribute has a decremented value, said decremented value indicating the number of processes that accesses said source memory page after said performing.

4. The method of claim 1 wherein said manipulating includes incrementing a prior value of the sharer attribute associated with said source memory page by 1, said prior value indicating the number of processes that accesses said source memory page prior to performing said copy-on-write procedure.

5. The method of claim 1 wherein said manipulating includes modifying, prior to performing said copy-on-write procedure, a copy-on-write attribute associated with said source memory page, said modifying enabling said copy-on-write procedure to execute on said source memory page.

6. The method of claim 1 wherein said manipulating includes changing an access attribute associated with said source memory page to read-only prior to performing said copy-on-write procedure.

7. The method of claim 1 wherein said copy-on-write procedure represents a procedure executed using a first specific operating system.

8. The method of claim 1 wherein said copy-on-write procedure represents a procedure executed by a second specific operating system.

9. The method of claim 1, wherein the value of the sharer attribute permits the copy-on-write procedure to be performed on the source memory page when only one process shares the source memory page.

10. A method for evacuating a source memory page, comprising:
    ascertaining a first set of processes, said first set of processes representing processes currently accessing said source memory page;
    for each process in said first set of processes, performing steps a) through c) as follows:
        a) incrementing a first value of a sharer attribute associated with said source memory page by 1 so that the sharer attribute will have an incremented value, said first value indicating the number of processes that accesses said source memory page, said incremented value is greater than the number of processes that accesses said source memory page prior to performing a copy-on-write procedure on said source memory page;
        b) after said incrementing, invoking copy-on-write procedure for said source memory page, thereby allowing said each process to be redirected to a respective target memory page whose content is copied from said source memory page by said copy-on-write procedure; and
        c) after said invoking, decrementing a second value of said sharer attribute associated with said source memory page by 1, said second value indicating the number of processes that accesses said source memory page after said invoking.

11. The method of claim 10 further comprising modifying, prior to said invoking, a copy-on-write attribute associated with said source memory page to enable said copy-on-write procedure to execute on said source memory page.

12. The method of claim 11 further comprising changing an access attribute associated with said source memory page to read-only prior to said invoking.

13. The method of claim 10 further comprising designating said source memory page a free source memory page after said steps a) through c) have been performed for all processes in said first set of processes.

14. The method of claim 10 wherein said copy-on-write procedure represents a procedure executed using a first specific operating system.

15. The method of claim 10 wherein said copy-on-write procedure represents a procedure executed by a second specific operating system.

16. The method of claim 10 wherein said copy-on-write procedure decrements said incremented value by 1.

17. The method of claim 10 wherein said copy-on-write procedure restore said access attribute to an access attribute value that existed prior to said invoking.

18. The method of claim 10 wherein said copy-on-write procedure restores said copy-on-write attribute to a copy-on-write attribute value that exited prior to said invoking.

19. The method of claim 10, wherein the incremented value of the sharer attribute permits the copy-on-write procedure to be performed on the source memory page when only one process shares the source memory page.

20. An article of manufacture comprising a program storage medium having computer readable code embodied therein, said computer readable code being configured to evacuate a source memory page, comprising:
    computer readable code ascertaining a first set of processes, said first set of processes representing processes currently accessing said source memory page; and
    computer readable code for manipulating parameters associated with said source memory page to enable at least one copy-on-write procedure to be performed on said source memory page irrespective whether said first set of processes has only one process or said first set of processes has multiple processes, wherein said manipulating comprises setting a sharer attribute in the parameters to a value that is greater than a number of processes in said first set, prior to performing said at least one copy-on-write procedure on said source memory page.

21. The article of manufacture of claim 20 further comprising computer readable code for performing said copy-on-write procedure for a sufficient number of times such that each process in said set of processes is redirected to a respective target memory page whose content is copied from said source memory page and such that said source memory page is free from access by any process of said set of processes after said performing.

22. The article of manufacture of claim 21 further comprising computer readable code for decrementing, after said performing, the value of said sharer attribute associated with said source memory page by 1 so that said sharer attribute has a decremented value, said decremented value indicating the number of processes that accesses said source memory page after said performing.

23. The article of manufacture of claim 20 wherein said computer readable code for said manipulating includes computer readable code for incrementing a prior value of a sharer attribute associated with said source memory page by 1, said prior value indicating the number of processes that accesses said source memory page prior to performing said copy-on-write procedure.

24. The article of manufacture of claim 20 wherein said computer readable code for said manipulating includes computer readable code for modifying, prior to performing said copy-on-write procedure, a copy-on-write attribute associated with said source memory page, said modifying enabling said copy-on-write procedure to execute on said source memory page.

25. The article of manufacture of claim 20 wherein said computer readable code for manipulating includes computer readable code for changing an access attribute associated with said source memory page to read-only prior to performing said copy-on-write procedure.

26. The article of manufacture of claim 20, wherein the value of the sharer attribute permits the copy-on-write procedure to be performed on the source memory page when only one process shares the source memory page.

27. An apparatus for evacuating a source memory page, the apparatus comprising:
 a copy-on-write facility configured to ascertain a first set of processes, said first set of processes representing processes currently accessing a source memory page;
 wherein the copy-on-write facility is configured to manipulate parameters associated with said source memory page to enable at least one copy-on-write procedure to be performed on said source memory page irrespective whether said first set of processes has only one process or said first set of processes has multiple processes,
 and wherein said the copy-on-write facility manipulates said parameters by setting a sharer attribute in said parameters to a value that is greater than a number of processes in said first set, prior to performing said at least one copy-on-write procedure on said source memory page.

28. The apparatus of claim 27, wherein the facility is configured to perform said copy-on-write procedure for a sufficient number of times such that each process in said set of processes is redirected to a respective target memory page whose content is copied from said source memory page and such that said source memory page is free from access by any process of said set of processes after said performing.

29. The apparatus of claim 27, wherein the facility is configured to decrement, after performing the copy-on-write procedure, the value of said sharer attribute associated with said source memory page by 1 so that said sharer attribute has a decremented value, said decremented value indicating the number of processes that accesses said source memory page after performing the copy-on-write procedure.

30. The apparatus of claim 27, wherein the facility is configured to increment a prior value of a sharer attribute associated with said source memory page by 1, said prior value indicating the number of processes that accesses said source memory page prior to performing said copy-on-write procedure.

31. The apparatus of claim 27, wherein the value of the sharer attribute permits the copy-on-write procedure to be performed on the source memory page when only one process shares the source memory page.

* * * * *

UNITED STATES PATENT AND TRADEMARK OFFICE
CERTIFICATE OF CORRECTION

PATENT NO.        : 7,325,107 B2                                    Page 1 of 1
APPLICATION NO. : 11/061391
DATED              : January 29, 2008
INVENTOR(S)      : Clifford J. Mather It is certified that error appears in the above-identified patent and that said Letters Patent is hereby corrected as shown below:

In column 3, line 41, delete "modem" and insert -- modern --, therefor.

In column 3, line 48, delete "modem" and insert -- modern --, therefor.

In column 8, line 23, in Claim 10, after "page by" insert -- 1, --.

In column 8, line 50, in Claim 17, delete "restore" and insert -- restores --, therefor.

In column 8, line 54, in Claim 18, delete "exited" and insert -- existed --, therefor.

Signed and Sealed this

Fifteenth Day of July, 2008

JON W. DUDAS
*Director of the United States Patent and Trademark Office*